(12) United States Patent
Winston et al.

(10) Patent No.: US 11,725,489 B2
(45) Date of Patent: Aug. 15, 2023

(54) INTELLIGENT, REAL-TIME RESPONSE TO CHANGES IN OILFIELD EQUILIBRIUM

(71) Applicant: LANDMARK GRAPHICS CORPORATION, Houston, TX (US)

(72) Inventors: Joseph Blake Winston, Houston, TX (US); Brent Charles Houchens, Houston, TX (US); Feifei Zhang, Spring, TX (US); Avinash Wesley, New Caney, TX (US); Andrew Shane Elsey, Clearwater, FL (US); Jonathan Nguyen, Friendswood, TX (US); Keshava Rangarajan, Sugar Land, TX (US); Olivier Germain, Houston, TX (US)

(73) Assignee: Landmark Graphics Corporation, Houston, TX (US)

(*) Notice: Subject to any disclaimer, the term of this patent is extended or adjusted under 35 U.S.C. 154(b) by 424 days.

(21) Appl. No.: 16/338,972

(22) PCT Filed: Apr. 27, 2017

(86) PCT No.: PCT/US2017/029756
§ 371 (c)(1),
(2) Date: Apr. 2, 2019

(87) PCT Pub. No.: WO2018/106277
PCT Pub. Date: Jun. 14, 2018

(65) Prior Publication Data
US 2021/0285309 A1 Sep. 16, 2021

Related U.S. Application Data

(60) Provisional application No. 62/431,339, filed on Dec. 7, 2016.

(51) Int. Cl.
*G06Q 10/06* (2023.01)
*E21B 43/12* (2006.01)
(Continued)

(52) U.S. Cl.
CPC .............. *E21B 43/12* (2013.01); *E21B 43/30* (2013.01); *G05B 13/00* (2013.01);
(Continued)

(58) Field of Classification Search
None
See application file for complete search history.

(56) References Cited

U.S. PATENT DOCUMENTS

| 5,941,305 A | 8/1999 | Thrasher et al. |
| 6,677,861 B1 | 1/2004 | Henry et al. |

(Continued)

FOREIGN PATENT DOCUMENTS

| WO | 2016172031 A1 | 10/2016 | |
| WO | WO-2016172031 A1 * | 10/2016 | ............. E21B 41/00 |

OTHER PUBLICATIONS

Chen et al. ("Defining Design and Optimization Method: Dynamic Simulation Model Produces Integrated BHA Solutions for Efficient Wellbore Delivery." Paper presented at the SPE/IADC Drilling Conference and Exhibition, London, England, UK, Mar. 17, 2015).*

(Continued)

*Primary Examiner* — Matthew D Henry
(74) *Attorney, Agent, or Firm* — Polsinelli PC

(57) ABSTRACT

Systems, methods, and computer-readable media are described for intelligent, real-time monitoring and managing of changes in oilfield equilibrium to optimize production of desired hydrocarbons and economic viability of the field. In some examples, a method can involve generating, based on a topology of a field of wells, a respective graph for the wells, each respective graph including computing devices (Continued)

coupled with one or more sensors and/or actuators. The method can involve collecting, via the computing devices, respective parameters associated with one or more computing devices, sensors, actuators, and/or models, and identifying a measured state associated with the computing devices, sensors, actuators, and/or models. Further, the method can involve automatically generating, based on the respective graph and respective parameters, a decision tree for the measured state, and determining, based on the decision tree, an automated adjustment for modifying production of hydrocarbons and/or an economic parameter of the hydrocarbon production.

18 Claims, 8 Drawing Sheets

(51) Int. Cl.
  *E21B 43/30* (2006.01)
  *G05B 13/00* (2006.01)
  *G06Q 10/0631* (2023.01)
  *G06Q 50/02* (2012.01)

(52) U.S. Cl.
  CPC ....... *G06Q 10/06313* (2013.01); *G06Q 50/02* (2013.01); *E21B 2200/20* (2020.05); *E21B 2200/22* (2020.05)

(56) References Cited

U.S. PATENT DOCUMENTS

| | | | |
|---|---|---|---|
| 8,073,665 B2 | 12/2011 | Watters et al. | |
| 8,185,311 B2 | 5/2012 | Narayanan et al. | |
| 2004/0040746 A1 | 3/2004 | Niedermayr et al. | |
| 2005/0149307 A1 | 7/2005 | Gurpinar et al. | |
| 2005/0267718 A1 | 12/2005 | Guyaguler et al. | |
| 2006/0064256 A1 | 3/2006 | Appleford et al. | |
| 2009/0039255 A1* | 2/2009 | Andrews | G01N 21/35 250/301 |
| 2010/0042458 A1 | 2/2010 | Rashid et al. | |
| 2011/0128160 A1* | 6/2011 | Overholt | E21B 41/00 700/282 |
| 2012/0215365 A1 | 8/2012 | Nath et al. | |
| 2013/0327138 A1 | 12/2013 | Richard et al. | |
| 2014/0362087 A1 | 12/2014 | Irani | |
| 2016/0034818 A1 | 2/2016 | Knecht et al. | |

OTHER PUBLICATIONS

Office Action; Canadian Application No. 3,039,470; dated Sep. 1, 2020.
Hasan, Agus, "Optimization and Control of Petroleum Reservoirs", Thesis for the Degree of Doctor of Philosophy; Norwegian University of Science and Technology; Mar. 4, 2013.
Nikolaou, Michael et al., "Production Optimization: A Moving-Horizon Approach", Society of Petroleum Engineers; SPE-99358-MS; 2006.
Saputelli, L.A., et al., "Promoting Real-Timer Optimization of Hydrocarbon Producing Systems",Society of Petroleum; SPE-83978-MS; 2003.
Saputelli, Luigi et al.,"Self-Learning Reservoir Management", Society of Petroleum; SPE-84064-PA; Dec. 2005.
International Search Report and Written Opinion; PCT Application No. PCT/US2017/029756; dated Aug. 17, 2017.

* cited by examiner

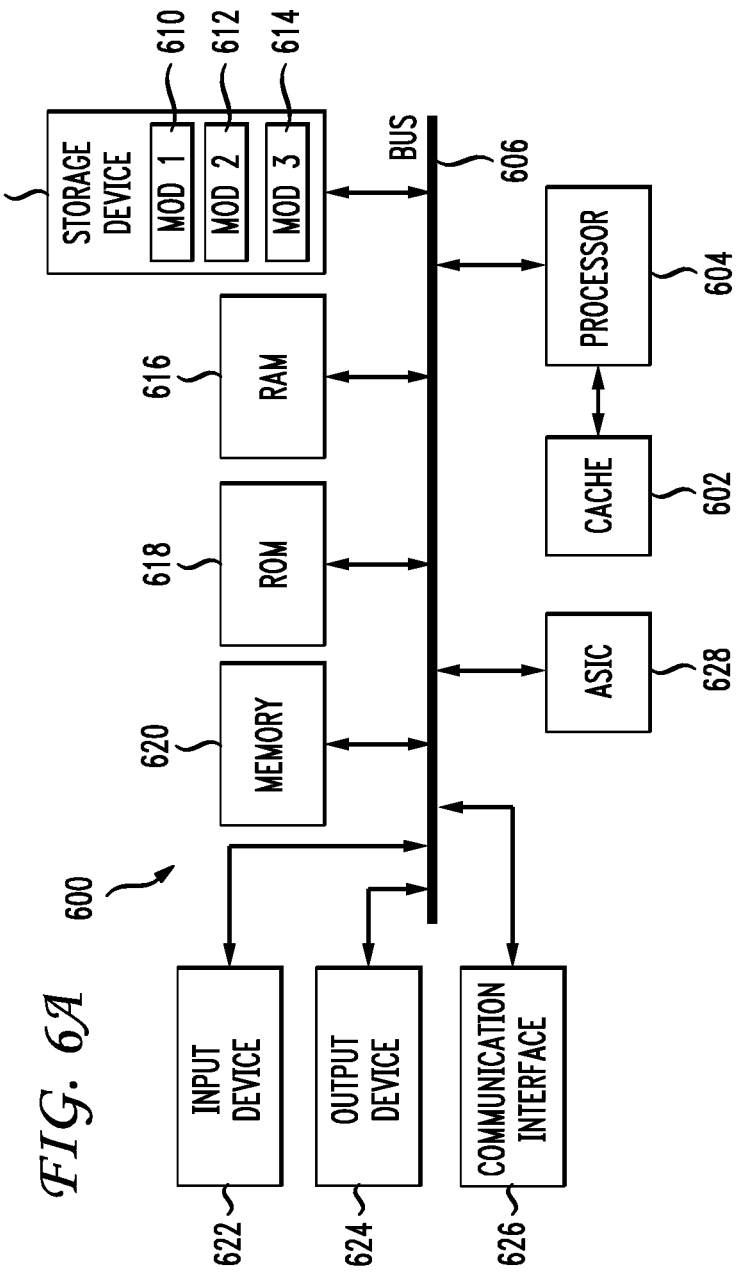

INTELLIGENT, REAL-TIME RESPONSE TO CHANGES IN OILFIELD EQUILIBRIUM

CROSS-REFERENCE TO RELATED APPLICATIONS

This application is a national stage entry of PCT/US2017/029756 filed Apr. 27, 2017, which claims the benefit of U.S. Provisional application No. 62/431,339 filed Dec. 7, 2016, each of said applications being expressly incorporated herein in their entirety.

TECHNICAL FIELD

The present technology pertains to changes in oilfield equilibrium, and more specifically to intelligent, real-time monitoring and automated managing of changes in the equilibrium of an oilfield to optimize production of desired hydrocarbons and the economic viability of the field.

BACKGROUND

An oilfield is a classically under-sampled system. This uncertainty often makes it difficult to select one or more attributes for optimization. Accordingly, current solutions are unable to optimize efficiency in oilfield operations and quickly adapt to changes in the oilfield equilibrium. Moreover, current solutions do not provide effective or efficient optimization of the economic viability of the production of hydrocarbons in an oilfield.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 6A and 6B illustrate schematic diagrams of example computing devices.

DETAILED DESCRIPTION

Figure 1A:
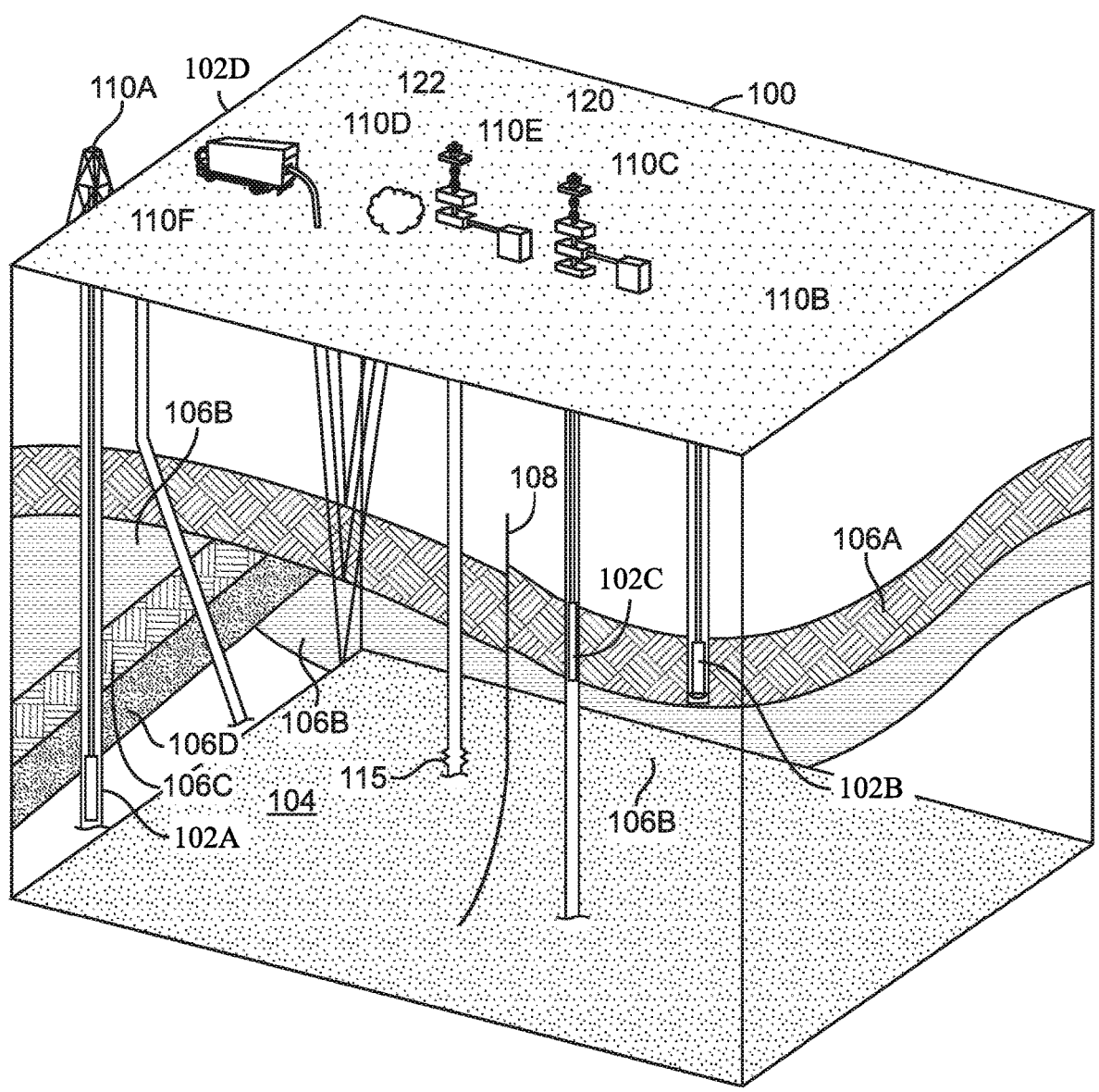
FIG. 1A illustrates a schematic view of an oilfield.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "graph" can include a bounded collection of objects or locations that make up a system, often called nodes in the mathematical abstraction, and directions to these places, traditionally known as edges. Some examples of the use of a graph include determining what locations are near a given place as well as following the trail (edge) from one place to another.

The term "topology" can include the arrangement of the different parts that make up a system.

The term "oilfield" can include a geological formation containing hydrocarbons, including liquid oils and gases, and the systems to explore, detect, drill, and produce those hydrocarbons.

Overview

Disclosed are systems, methods, and computer-readable storage media for intelligent, real-time responses to changes in an oilfield equilibrium. In some examples, a method can involve generating, based on a topology of a field including multiple wells, a respective graph for the wells. Each respective graph can include computing devices, such as IoT (Internet of Things) devices, which can be coupled with one or more sensors, one or more actuators, and/or one or more models. The one or more models can include physics-based models, data-driven models, and/or hybrid models, for example.

Physics-based models can include models built on first-principles and laws of nature, which may include unknown parameters and require closure relations. Examples of physics-based models include conservation of mass, conservation of momentum, 1st and 2nd laws of thermodynamics, Maxwell's equations, and the like.

Data-driven models can include models that attempt to model actual real world data via various analysis techniques, and involve post hoc modeling of collected data. Examples include numerical analysis, mathematical analysis, curve fitting, classifying and clustering, with any variables not necessarily related to a physical variable or parameter. Data-driven models can utilize primary data and/or secondary data. Primary data include direct observations or measurements, and secondary data may include indirect measurements or inferences, including data from complex tests, such as formation permeability, skin factor, etc.

Hybrid models can include a combination of physics-based models and data-driven models. When referring to a model herein, such as a physics-based model or data-driven model, the term "model" encompasses the singular and plural, and thus may include one or more of such type of models, unless specifically noted.

The method can further involve collecting, via the computing devices, respective parameters associated with one or more of the computing devices and at least one of the one or more sensors, the one or more actuators, and/or the one or more models.

The method can also involve identifying a measured state associated with a computing device from the computing devices, a sensor from the one or more sensors, an actuator from the one or more actuators, and/or a model from the one or more models. The measured state can be associated with a current hydrocarbon production state and/or a current economic viability of the current hydrocarbon production state.

In addition, the method can involve generating, based on the respective graph and respective parameters, a decision tree for the measured state, and determining, based on the decision tree, one or more adjustments associated with the measured state for increasing at least one of the current hydrocarbon production and the current economic viability associated with the current hydrocarbon production. The one or more adjustments can be selected and/or made in order to increase production and/or economic viability. For example, the one or more adjustments can be made when a sensor measures an amount of flow that indicates a leak or an amount of pressure that indicates a problem. The one or more adjustments can include adjustments to a sensor, an actuator, a computing device, a model, etc. Moreover, the one or more adjustments can be tailored to fix or improve the leak or pressure in order to increase production and/or economic viability.

Description

As previously explained, oilfields are classically under-sampled systems, which results in significant uncertainty. This uncertainty often makes it difficult to select one or more attributes for optimization. Accordingly, current solutions are unable to provide efficient and effective optimization of oilfield operations and production of hydrocarbons. The disclosed technology addresses the need in the art for intelligent, real-time monitoring and management of changes in the oilfield equilibrium.

Figure 1B:
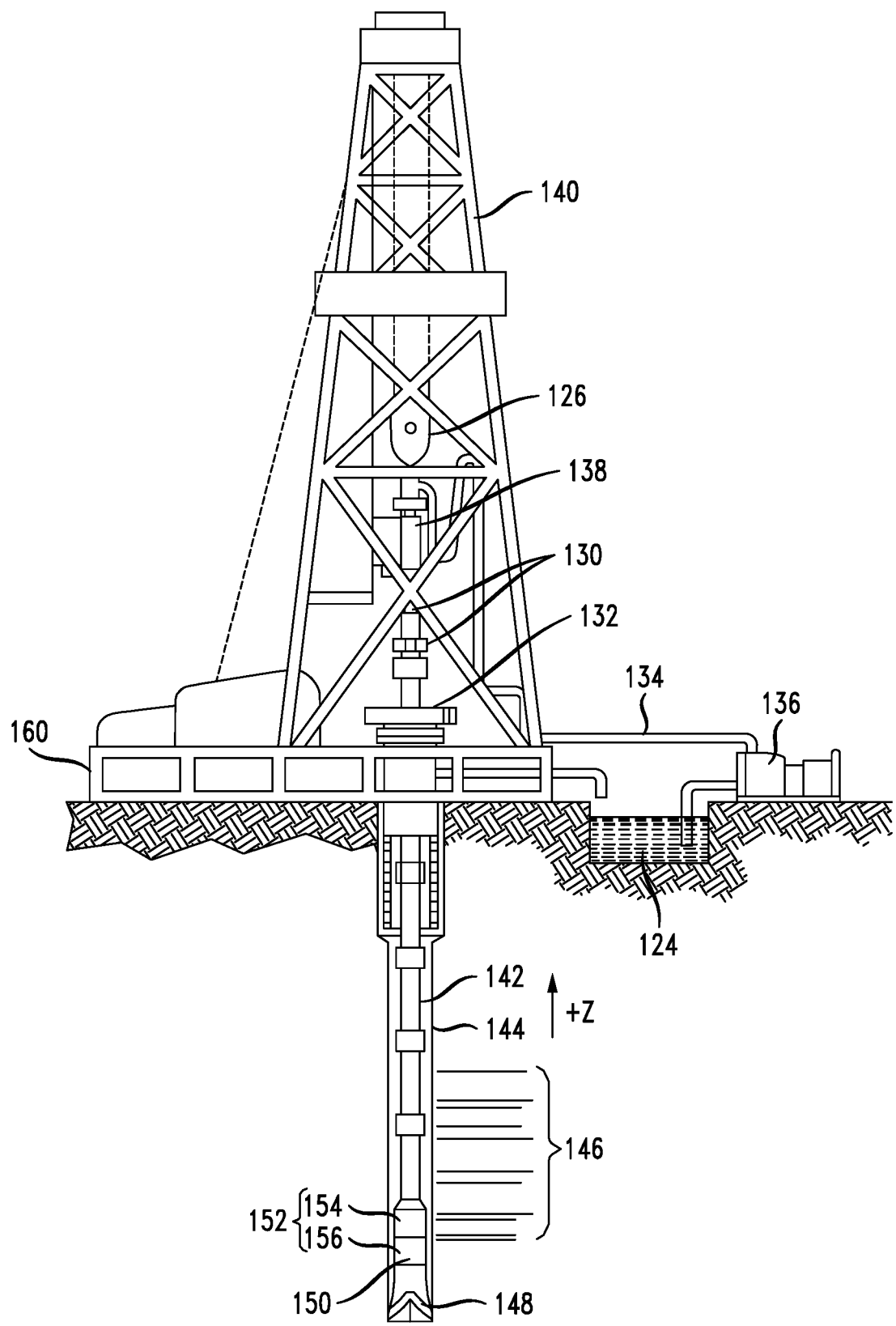
FIG. 1B illustrates a diagrammatic view of a logging while drilling (LWD) wellbore operating environment.
Figure 1C:
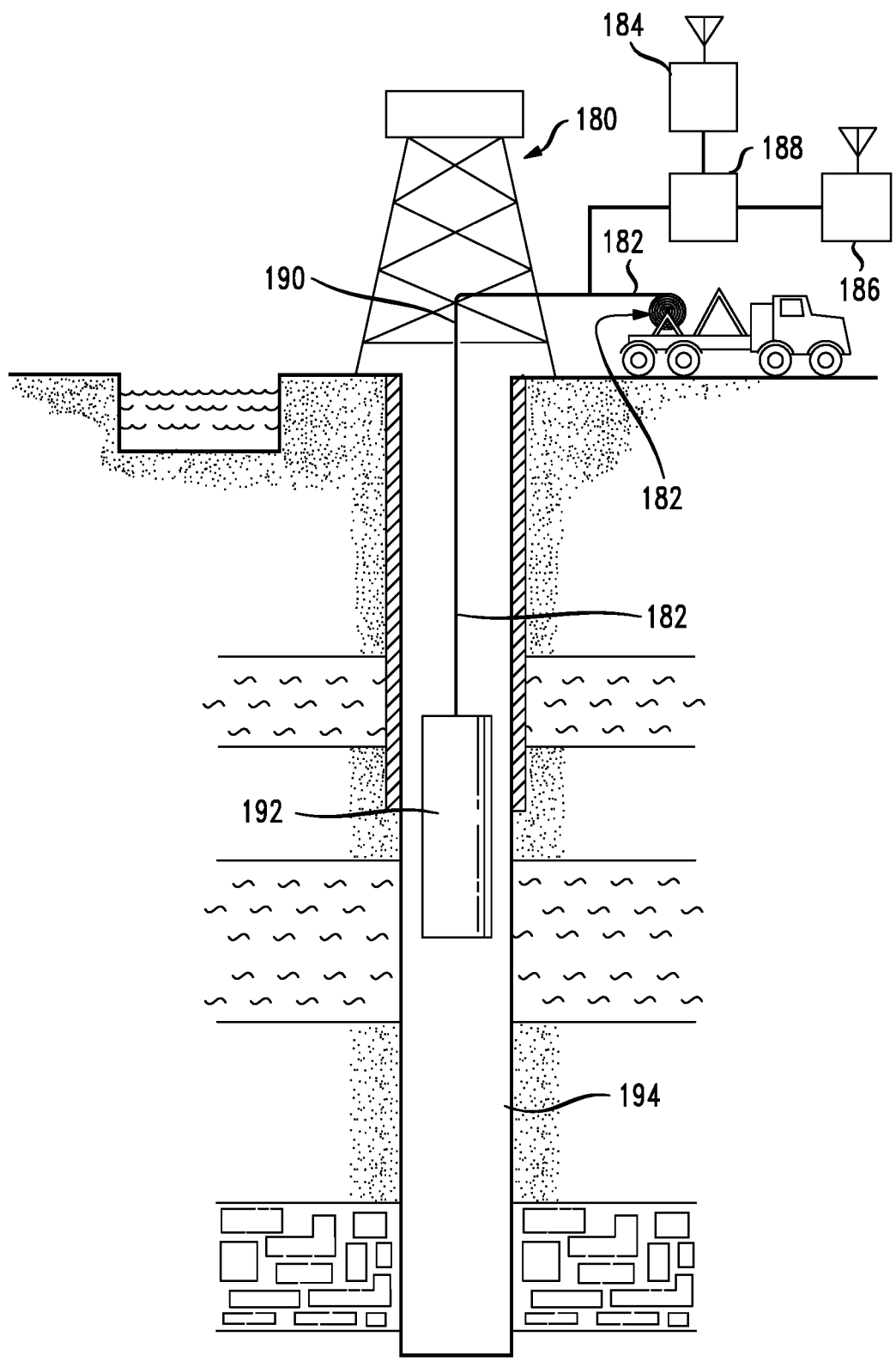
FIG. 1C illustrates a schematic diagram of an example system for production logging.
Figure 2:
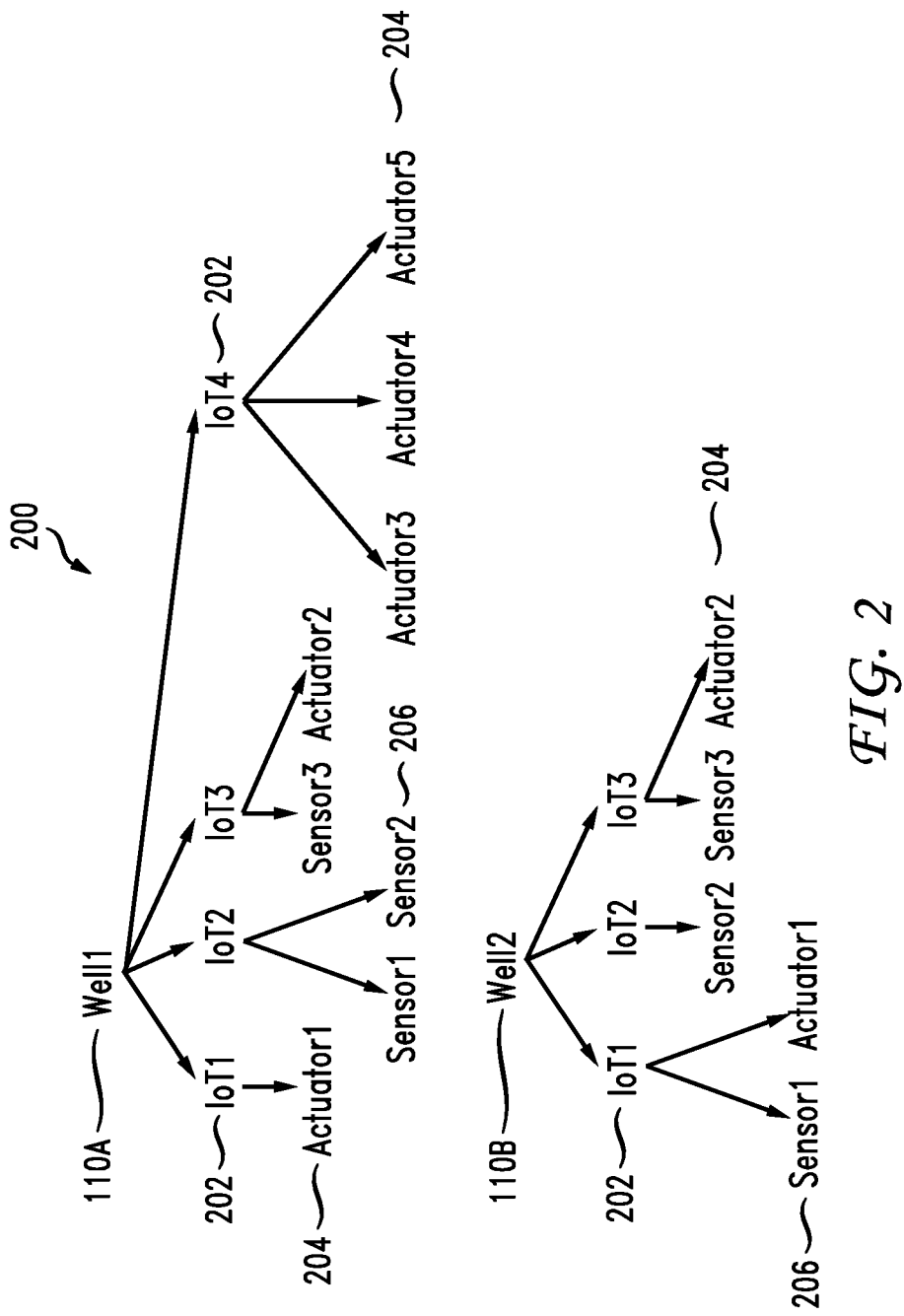
FIG. 2 illustrates a graph of an example system topology in an oilfield.
Figure 3:
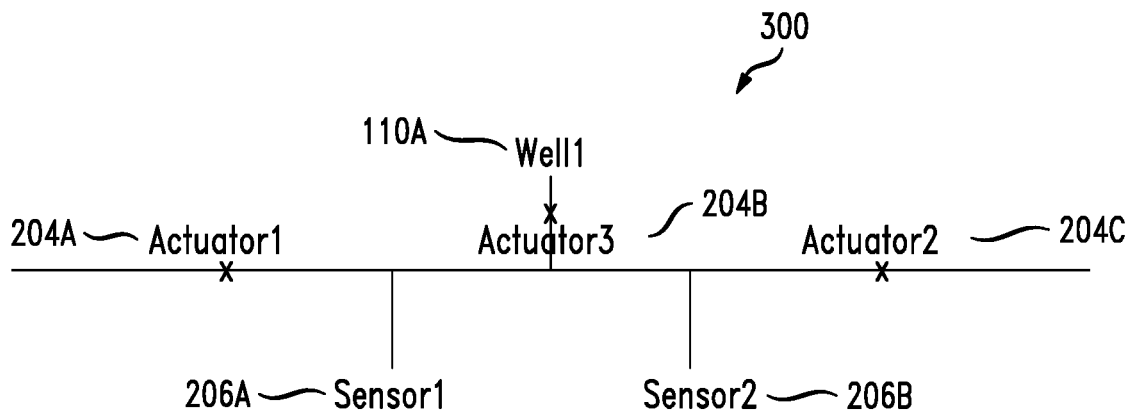
FIG. 3 illustrates a graph of an example topology of an oilfield.
Figure 4:
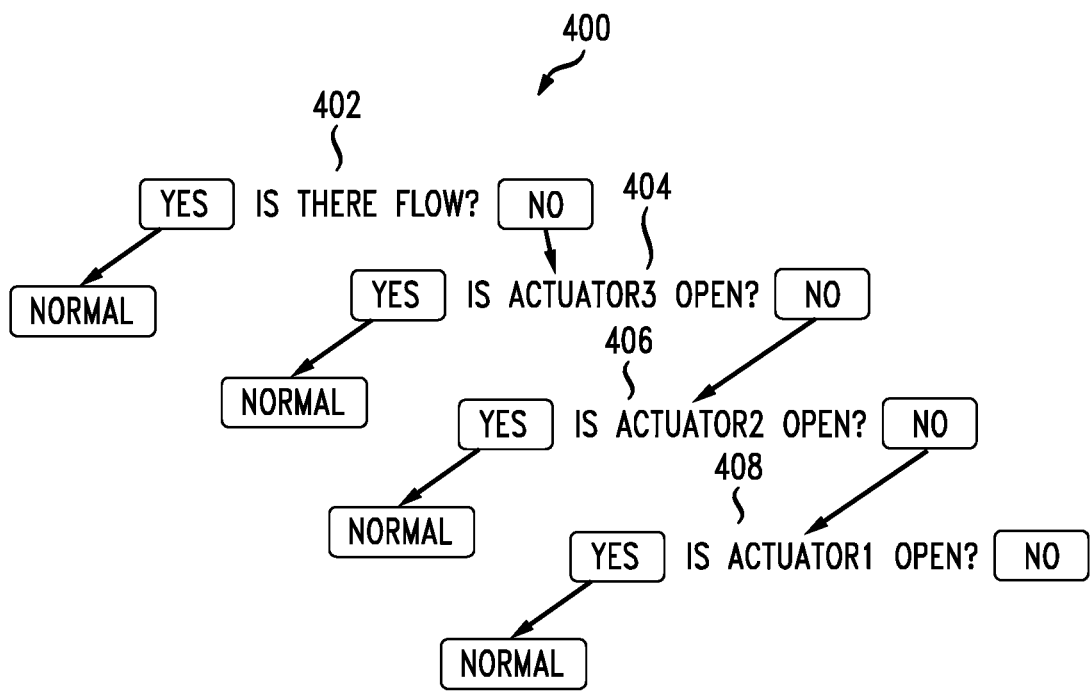
FIG. 4 illustrates an example decision tree associated with an example condition.

In particular, disclosed herein are systems, methods, and computer-readable media for intelligent and real-time monitoring and management of changes in the oilfield equilibrium. The disclosure will begin with a description of example oilfields and downhole environments, as shown in FIGS. 1A-C. A discussion of concepts and technologies for intelligent and real-time monitoring and management of changes in the oilfield equilibrium, as shown in FIGS. 2-4, will then follow. The disclosure concludes with a discussion of example computing devices suitable for performing various aspects the technologies disclosed herein. The disclosure now turns to FIG. 1A.

FIG. 1A illustrates an exemplary oilfield in which the present disclosure may be implemented. The oilfield 100 can include multiple wells 110A-F which may have tools 102A-D for data acquisition. The multiple wells 110A-F may target one or more hydrocarbon reservoirs. Moreover, the oilfield 100 has sensors and computing devices positioned at various locations for sensing, collecting, analyzing, and/or reporting data. For instance, well 110A illustrates a drilled well having a wireline data acquisition tool 102B suspended from a rig at the surface for sensing and collecting data, generating well logs, and performing downhole tests which are provided to the surface. Well 110B is currently being drilled with drilling tool 102C which may incorporate subs and additional tools for logging while drilling (LWD) and/or measuring while drilling (MWD). Well 110C is a producing well having a production tool 102D. The tool 102D is deployed from a tree 120 at the surface (having valves, spools, and fittings). Fluid flows through perforations in the casing (not shown) and into the production tool 102D in the wellbore to the surface. Well 110D illustrates a well having blowout event of fluid from an underground reservoir. The tool 102A may permit data acquisition by a geophysicist to determine characteristics of a subterranean formation and features, including seismic data. Well 110E is undergoing fracturing and having initial fractures 115, with producing equipment 122 at the surface. Well 110F is an abandoned well which had been previously drilled and produced.

The oilfield 100 can include a subterranean formation 104, which can have multiple geological formations 106A-D, such as a shale layer 106A, a carbonate layer 106B, a shale layer 106C, and a sand layer 106D. In some cases, a fault line 108 can extend through one or more of the layers 106A-D.

Sensors and data acquisition tools may be provided around the oilfield 100, multiple wells 110A-E and associated with tools 102A-D. The data may be collected to a central aggregating unit and then provided to a processing unit. The data collected by such sensors and tools 102A-D can include oilfield parameters, values, graphs, models, predictions, conditions and/or operations, and may describe properties or characteristics of components and/or conditions below ground or on the surface, manage conditions and/or operations in the oilfield 100, analyze and adapt to changes in the oilfield 100, etc. The data can include, for example, properties of formations or geological features, physical conditions in the oilfield 100, events in the oilfield 100, parameters of devices or components in the oilfield 100, etc.

FIG. 1B illustrates a diagrammatic view of a logging while drilling (LWD) wellbore operating environment. As depicted in FIG. 1B, a drilling platform 160 is equipped with a derrick 140 that supports a hoist 126 for raising and lowering a drill string 142. The hoist 126 suspends a top drive 138 suitable for rotating the drill string 142 and lowering the drill string 142 through the well head 132. Connected to the lower end of the drill string 142 is a drill bit 148. As the drill bit 148 rotates, the drill bit 148 creates a wellbore 144 that passes through various formations 146. A pump 136 circulates drilling fluid through a supply pipe 134 to top drive 138, down through the interior of drill string 142, through orifices in drill bit 148, back to the surface via the annulus around drill string 142, and into a retention pit 124. The drilling fluid transports cuttings from the wellbore 144 into the pit 124 and aids in maintaining the integrity of the wellbore 144. Various materials can be used for drilling fluid, including oil-based fluids and water-based fluids.

Logging tools 156 can be integrated into the bottom-hole assembly 152 near the drill bit 148. As the drill bit 148 extends the wellbore 144 through the formations 146, logging tools 156 collect measurements relating to various formation properties as well as the orientation of the tool and various other drilling conditions. The bottom-hole assembly 152 may also include a telemetry sub 154 to transfer measurement data to a surface receiver 130 and to receive commands from the surface. In at least some cases, the telemetry sub 154 communicates with a surface receiver 130 using mud pulse telemetry. In some instances, the telemetry sub 154 does not communicate with the surface, but rather stores logging data for later retrieval at the surface when the logging assembly is recovered.

Each of the logging tools 156 may include a plurality of tool components, spaced apart from each other, and communicatively coupled with one or more wires. The logging tools 156 may also include one or more computing devices 150 communicatively coupled with one or more of the plurality of tool components by one or more wires. The computing device 150 may be configured to control or monitor the performance of the tool, process logging data, and/or carry out the methods of the present disclosure.

In at least some instances, one or more of the logging tools 156 may communicate with a surface receiver 130 by a wire, such as wired drillpipe. In other cases, the one or more of the logging tools 156 may communicate with a surface receiver 130 by wireless signal transmission. In at least some cases, one or more of the logging tools 156 may receive electrical power from a wire that extends to the surface, including wires extending through a wired drillpipe.

Additionally, logging tools 156 may include a resistivity logging tool, for example. Resistivity logging tools may be used to provide an indication of the electrical resistivity of rock formations surrounding a wellbore. The electrical resistivity data is useful in ascertaining the presence or absence of hydrocarbons in the subterranean formations. A typical resistivity tool includes a transmitter antenna and at least two receiver antennas located at different distances from the transmitter antenna along the axis of the tool. The transmitter antenna is used to transmit electromagnetic waves into the surrounding formation. In turn, the magnetic field in the formation induces an electrical voltage in each receiver antenna. Due to geometric spreading and absorption by the surrounding earth formation, the induced voltages in the two receiving antennas have different phases and amplitudes. The phase difference and amplitude ratio (attenuation) of the induced voltages in the receiver antenna are indicative of the resistivity of the formation.

Referring to FIG. 1C, a tool having tool body 192 can be employed with "wireline" systems, in order to carry out logging or other operations. For example, instead of using the drill string 142 of FIG. 1B to lower tool body 192, which may contain sensors or other instrumentation for detecting and logging nearby characteristics and conditions of the wellbore and surrounding formation, a wireline conveyance 182 can be used. The tool body 192 can be lowered into the wellbore 194 by wireline conveyance 182 and hoist 190. The wireline conveyance 182 can be anchored in the drill rig 180 or portable means such as a truck. The wireline conveyance 182 can be one or more wires, slicklines, cables, or the like, as well as tubular conveyances such as coiled tubing, joint tubing, or other tubulars.

The illustrated wireline conveyance 182 provides support for the tool, as well as enabling communication between the tool processors on the surface and providing a power supply. The wireline conveyance 182 can include fiber optic cabling for carrying out communications. The wireline conveyance 182 is sufficiently strong and flexible to tether the tool body 192 through the wellbore 194, while also permitting communication through the wireline conveyance 182 to local processor 188 and/or remote processors 184-186. Additionally, power can be supplied via the wireline conveyance 182 to meet power requirements of the tool. For slickline or coiled tubing configurations, power can be supplied downhole with a battery or via a downhole generator.

FIG. 2 illustrates an example system topology 200 for intelligent monitoring and management of an oilfield, such as oilfield 100 shown in FIG. 1A. The topology 200 can include wells 110A-B, and each well can include one or more associated sensors 206 and/or actuators 204. Each well 110A, 110B can have a graph that is directed from the respective well 110A, 110B, to the computing devices 202, which are shown as Internet of Things (IoT) in FIG. 2, and continuing to the sensor(s) 206 and actuator(s) 204 attached to their respective computing device 202. This graph can be used to diagnose problems in the oilfield.

For example, if there is no information from IoT2, then the lack of information from IoT2 can suggest a problem with IoT2. On the other hand, if IoT2 is available or functioning but Sensor1 and Sensor2 are not reporting data or lack connectivity, the lack of information from these sensors may suggest issues with these sensors.

Data and conditions from the computing devices 202, actuators 204, and sensors 206 can be collected and monitored to quickly identify problems and solutions on wells 110A, 110B. Knowledge of the topology 200 can help identify which specific component may be having an issue as previously mentioned.

Wells 110A-B are illustrated as non-limiting examples for clarity and explanation. One of ordinary skill in the art will recognize that other examples or implementations may have more or less wells.

FIG. 3 illustrates an example topology 300 of an oilfield (e.g., oilfield 100). In this case, there is one well 110A (Well1), three actuators 204A-C (Actuator1, Actuator2, Actuator3), and two sensors 206A-B (Sensor1 and Sensor2). Inferences, predictions, and calculations can be made based on the topology 300.

For example, if all the actuators 204A-C are valves, then when Actuator1, Actuator2, and Actuator3 are closed, Sensor1, a flow sensor, must measure no flow. If there is flow at Sensor1, then either an actuator failed to close complely or there is a leak. As another example, if Sensor2 is a pressure device, a pressure near 1 atmosphere would indicate that the pressure inside the pipe is almost the same as the pressure outside of the pipe.

The information from FIGS. 2 and 3, describing the topology of the hardware, software, sensors, and actuators along with the topology of the oilfield, can be combined into a decision tree that assists in identifying the root-cause of a condition, such as a failure or inefficiency. FIG. 4 illustrates a partial decision tree 400 for determining why there is no flow in a topology of sensors and actuators such as topology 300 shown in FIG. 3. For clarity and simplicity, not shown in FIG. 4 is the complete tree that takes into account failure of the sensors 206, actuators 204, and IoT devices 202.

As illustrated in FIG. 4, a decision 402 is made on whether there is a flow. If there is a flow, then the status is normal. If there is no flow detected, then a decision 404 is made to determine whether Actuator3 is open. If Actuator3 is open, then the status is normal. If the Actuator3 is not open, then a decision 406 is made on whether Actuator2 is open. If Actuator2 is determined to be opened, then the status is normal. If the Actuator2 is not open, then a decision 408 is made on whether Actuator1 is open. Again, if Actuator1 is open, the status is normal. On the other hand, if Actuator1 is not open, then a problem or failure is detected. The problem or failure in this example can be an unexpected flow, such as a leak.

Having disclosed example systems and environments, the disclosure now turns to a general discussion of intelligent and real-time monitoring and management of changes to the oilfield equilibrium.

Physics-based and/or data-driven models in conjunction with real-time data, sensors, and actuators are used to construct a methodology that can in real-time adjust the physical hardware in wells, such as valves, chokes, pumps, separators, etc., and thus improve performance and ability to meet predetermined objectives.

In some examples, a system can optimize the economic viability of the production of hydrocarbons in near real-time, either currently or over the lifespan of the field, or some combination thereof, through a system of distributed sensors and actuators (e.g., valves, chokes, pumps, separators, etc.) running autonomously. The two levels of sensing and control can include the following.

A first level can have each device looking only at itself and comparing to models (run locally or remotely) that predict expected behavior or operating envelopes, identifying when an operating envelope is breached, and applying control based on self-information. A second level can have each device communicating with all surrounding devices and each device can use additional data and models to predict expected behavior and operating envelopes, identify when other devices cause its envelop to be breached in context of the system topology, reference historical system knowledge, and aid the system of devices in a root-cause analysis resulting in the appropriate system-level control.

The first use case can have at least one model executing on an individual device or computer. The individual device or computer with its associated software will gather input in real-time from available input devices and sensors on the system. These different observations for the current time as well as some past history can provide a view, possibly not unique, into some part of the oilfield environment.

Control of the system can occur through one or more actuators, which also can be the system's responsibility. Possible examples of actuators and control operations can include chokes, downhole valves, artificial lift, injection (e.g., CO2 and/or water), additional perforations (e.g., moving sleeves, valves), infill drilling, planning sidetracks, injecting proppants or surfactants, etc. The interaction of the system with the oilfield is not restricted to simply controlling a single device on an identified well. Rather, the ensemble can adjust actuators directly or indirectly, as required, automatically.

The model(s) on the system can evaluate the information and adjust as required. The change in the total system, which is the one computer and its associated hardware, software, sensors and actuators, generally moves towards a goal(s) of maximizing the extraction of hydrocarbons from the field or maximizing the profitability considering economic factors, such as cost of powering artificial lift in conjunction with commodity price.

Example use cases are further described below:

Case 1A: Self-Healing

In one scenario, if the observations from the sensors are out of limit, then the system takes appropriate action(s) generally through actuation to bring the system back to an optimum level. Actions taken during the out of bounds condition might including waiting for the devices to move into a correct state or activating another actuator on this system to correct the issue. Additionally, in some cases, the system might be able to determine if a sensor or actuator is failing. If the system requires cooperation to heal itself, it will attempt to contact other systems for help.

Case 1B: Self-Preservation

In the extreme case where the system cannot be brought back to optimum or is too far out of bounds, the appropriate response might be to shutdown some subset or the entire system as a safety mechanism. Alarms might also be sent in this use case. As before in the Self-Healing case, self-preservation might require other parts of the system in order to achieve this goal and thus the system will try to find some system to assist in the task of maintaining a healthy oilfield.

Case 2: Collaborative Self-Healing

This use case can be collaborative in that there is communication of data, control, and models between devices, which can be logically and physically adjacent. This interaction between close "neighbors" allows for a more global view of the oilfield and thus allows for informed actions by the system.

This use case also has the possibility of having one or more additional models that combine a part or the whole information received from the collective system as well as having access to some portion of the actuators. Despite the differences from the first use cases, the basic steps for this use case can follow closely to those in the first use cases. The aggregate system as before ingests real-time data from sensors. The combined system uses this information plus one or more models to control the environment through the actuators. In general, the ensemble moves toward a goal that optimizes one or more attributes of interest in the oilfield. When the group notices abnormal behavior, the group notifies the appropriate participants and determines root-cause. The models can adjust or entirely different models can be used at different times.

One distinct advantage of knowing the adjacent systems as described in this use case can be performing root-cause analysis using the system topology and the oilfield topology as additional input data. This additional information allows the model to diagnose problems that occur inside of the collective system.

Case 3: Collaborative Increase of Production Via Drilling a New Well or Sidetrack This use case is also collaborative in communication of data, control, and models between devices, which are logically and physically adjacent. This interaction between close "neighbors" allows for a more global view of the oilfield and thus allows better-informed actions by the system. The goal in this scenario is increase the field production by automated drilling of an additional well or sidetrack.

In one example, a field (e.g., oilfield 100) can contain five wells distributed in space over what is originally thought to be the extent of the reservoir. After some significant production time, production is reduced as expected in four of the five wells. However, the fifth well shows no drop in production, indicating that the reservoir likely extends near the fifth well. The system automatically uses this data to update the reservoir model, run a revised economic analysis, and an automated drilling rig drills a sixth well in the vicinity of the fifth well to increase production from the previously unknown extended reserves.

As illustrated, oilfield modeling, sensing, and actuation can provide a methodology where the operator has fully automatic tools that move toward one or more identified outcomes in real-time. This automatic control can result in optimal behavior of the combined system and thus increases the economic value of the field.

Additionally, the graphs that describe the layout of the sensors and actuators as well as the topology of the field, as shown in FIGS. 2 and 3, can be considered together for optimization. These graphs increase the ability to identify root-cause of failures, thus reducing costly repairs. Additionally, in some examples, the different models of the oilfield can be combined to produce other views into the system that have value for different roles such as repair or science.

Figure 5:
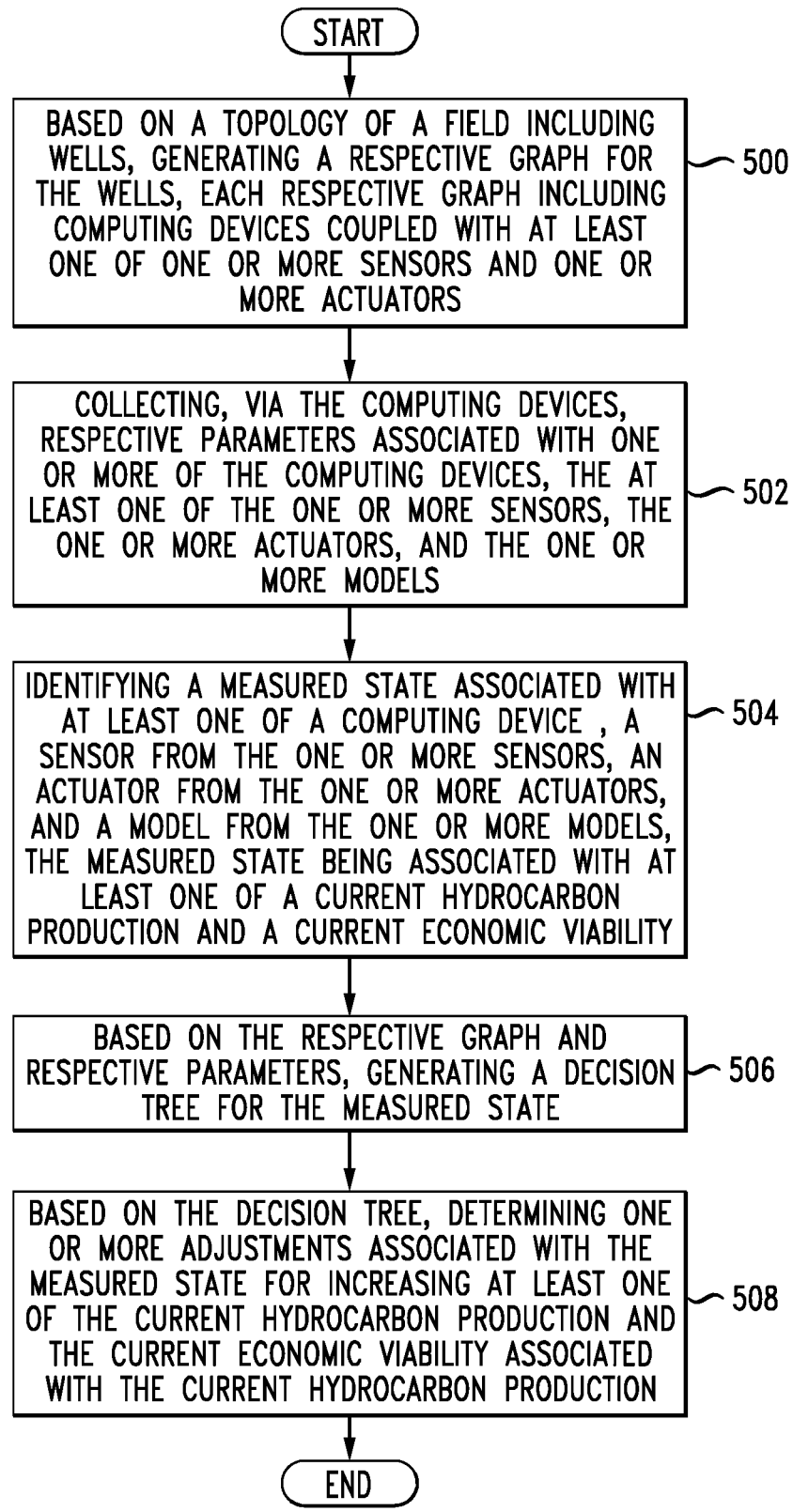
FIG. 5 illustrates an example method embodiment.

Having disclosed example systems and concepts for intelligent and real-time optimizations in an oilfield, the disclosure now turns to the example method shown in FIG. 5. The steps outlined herein are exemplary and can be implemented in any combination thereof, including combinations that exclude, add, or modify certain steps.

At step 500, a method can involve generating, based on a topology of a field of wells, a respective graph for the wells. Each respective graph can include computing devices such as IoTs, and each of the computing devices can be coupled with one or more sensors, and/or one or more actuators. The actuators can include, for example, a choke, a downhole valve, an artificial lift, a sleeve, a perforation device, etc. The sensors can include a sensor for detecting formation properties, fluid, temperature, density, events, etc. One or more models can also be used to generate the respective graph for the well. The models can include physics-based models, data-driven models and rules.

At step 502, the method can involve collecting, via the computing devices, respective parameters associated with the computing devices, the one or more sensors, and/or the one or more actuators, and/or the one or more models. At step 504, the method can involve identifying a measured state associated with a computing device from the computing devices, a sensor from the one or more sensors, and/or an actuator from the one or more actuators, and/or a model from the one or more models. The measured state can be a condition, parameter, or state associated with a current state of hydrocarbon production and/or a current economic viability of the current state of hydrocarbon production. For example, the measured state can be a flow state which indicates a leak during a current hydrocarbon production, which would likely also suggest a lower hydrocarbon production or economic viability.

At step 506, the method can involve generating, based on the respective graph and respective parameters, a decision tree for the measured state. At step 508, the method can further involve determining, based on the decision tree, one or more adjustments associated with the measured state for increasing at least one of the current hydrocarbon production and the current economic viability associated with the current hydrocarbon production. The one or more adjustments can be, for example, fixing an issue that is causing decreased production and/or economic viability, such as a leak.

The method can make the one or more adjustments by modifying the operation of at least one of the one or more actuators to adapt to, or correct, a failure or a non-optimal state that may be decreasing production or economic viability. For example, the method can include activating an actuator, turning off an actuator, etc. The method can thus use the computing devices, sensors, actuators, as well as topology information, to control an environment and condition in the field.

Figure 6B:
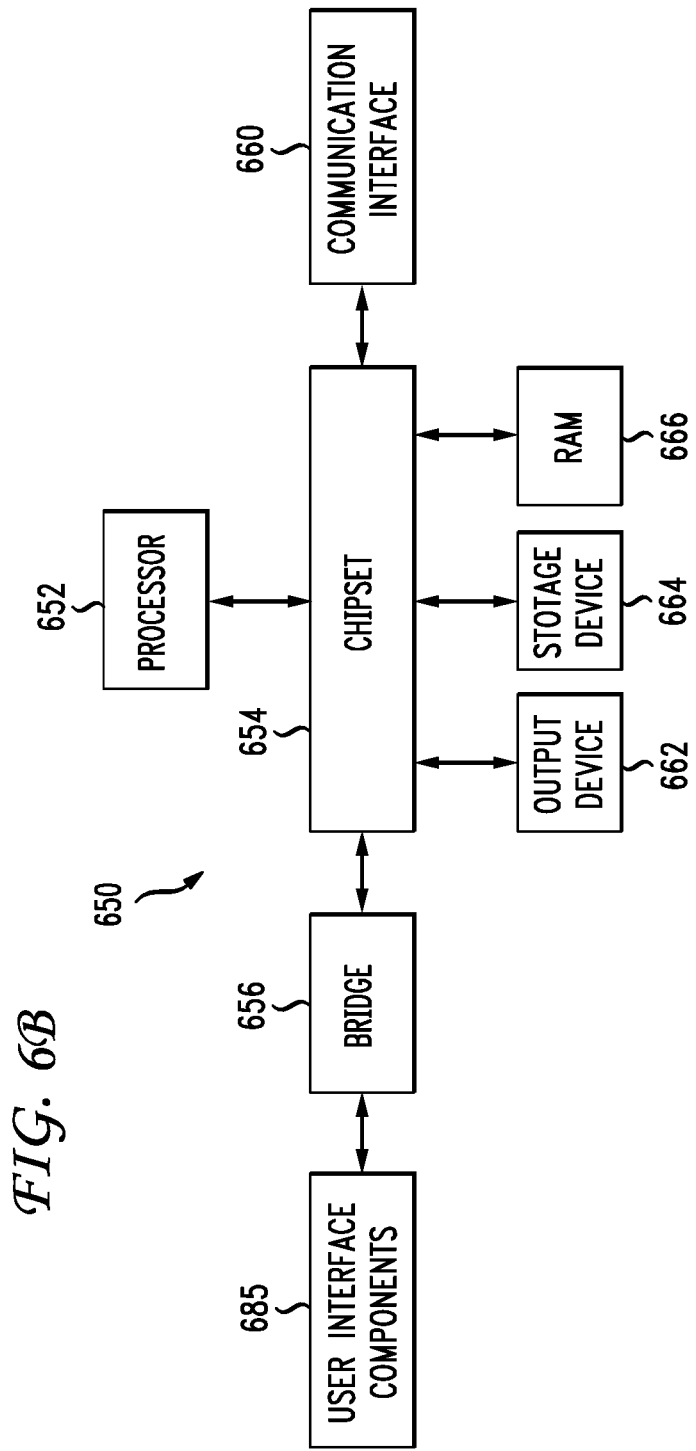

As one of ordinary skill in the art will recognize, one or more of the steps described herein can be performed by one or more computing devices, such as system 600 and/or 650 described with respect to FIGS. 6A and 6B. Moreover, one or more of the steps described herein can be automatic, automated, dynamic, and/or in real-time or substantially in real-time.

The disclosure now turns to FIGS. 6A and 6B, which illustrate example computing devices which can be employed to perform various steps, methods, and techniques disclosed above. The more appropriate embodiment will be apparent to those of ordinary skill in the art when practicing the present technology. Persons of ordinary skill in the art will also readily appreciate that other system embodiments are possible.

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a system bus computing system architecture 600 wherein the components of the system are in electrical communication with each other using a bus 606. Exemplary system 600 includes a processing unit (CPU or processor) 604 and a system bus 606 that couples various system components including the system memory 620, such as read only memory (ROM) 618 and random access memory (RAM) 616, to the processor 604. The system 600 can include a cache of high-speed memory connected directly with, in close proximity to, or integrated as part of the processor 604. The system 600 can copy data from the memory 620 and/or the storage device 608 to the cache 602 for quick access by the processor 604. In this way, the cache 602 can provide a performance boost that avoids processor 604 delays while waiting for data. These and other modules can control or be configured to control the processor 604 to perform various actions. Other system memory 620 may be available for use as well.

The memory 620 can include multiple different types of memory with different performance characteristics. The processor 604 can include any general purpose processor and a hardware module or software module, such as module 1 610, module 2 612, and module 3 614 stored in storage device 608, configured to control the processor 604 as well as a special-purpose processor where software instructions are incorporated into the actual processor design. The processor 604 may essentially be a completely self-contained computing system, containing multiple cores or processors, a bus, memory controller, cache, etc. A multi-core processor may be symmetric or asymmetric.

To enable user interaction with the computing device 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing device 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 can be a non-volatile memory, and can be a hard disk or other types of computer readable media which can store data that are accessible by a computer, such as magnetic cassettes, flash memory cards, solid state memory devices, digital versatile disks, cartridges, random access memories (RAMs) 616, read only memory (ROM) 618, and hybrids thereof.

The system 600 can include an integrated circuit 628, such as an application-specific integrated circuit (ASIC) configured to perform various operations. The integrated circuit 628 can be coupled with the bus 606 in order to communicate with other components in the system 600.

The storage device 608 can include software modules 610, 612, 614 for controlling the processor 604. Other hardware or software modules are contemplated. The storage device 608 can be connected to the system bus 606. In one aspect, a hardware module that performs a particular function can include the software component stored in a computer-readable medium in connection with the necessary hardware components, such as the processor 604, bus 606, output device 624, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 652, representative of any number of physically and/or logically distinct resources capable of executing software, firmware, and hardware configured to perform identified computations. Processor 652 can communicate with a chipset 654 that can control input to and output from processor 652. In this example, chipset 654 outputs information to output 662, such as a display, and can read and write information to storage device 664, which can include magnetic media, and solid state media, for example. Chipset 654 can also read data from and write data to RAM 666. A bridge 656 for interfacing with a variety of user interface components 685 can be provided for interfacing with chipset 654. Such user interface components 685 can include a keyboard, a microphone, touch detection and processing circuitry, a pointing device, such as a mouse, and so on. In general, inputs to system 650 can come from any of a variety of sources, machine generated and/or initially human generated.

Chipset 654 can also interface with one or more communication interfaces 660 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 652 analyzing data stored in storage 664 or 666. Further, the machine can receive inputs from a user via user interface components 685 and execute appropriate functions, such as browsing functions by interpreting these inputs using processor 652.

It can be appreciated that example systems 600 and 650 can have more than one processor 604/652 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

Statements of the Disclosure Include:

Statement 1: A method comprising: based on a topology of a field comprising a plurality of wells, generating a respective graph for the plurality of wells, each respective graph comprising a plurality of computing devices, wherein each of the plurality of computing devices is coupled with at least one of one or more sensors, one or more actuators; collecting, via the plurality of computing devices, respective parameters associated with one or more of the plurality of computing devices and at least one of the one or more sensors, the one or more actuators, and one or more models; identifying a measured state associated with at least one of a computing device from the plurality of computing devices, a sensor from the one or more sensors, an actuator from the one or more actuators, and a model from the one or more models, the measured state corresponding to at least one of current hydrocarbons and a current economic parameter associated with the current hydrocarbons; based on the respective graph and respective parameters, generating a decision tree for the measured state; and based on the decision tree, determining one or more adjustments associated with the measured state for modifying production of at least one of the current hydrocarbons or improving the current economic parameter associated with the current hydrocarbons.

Statement 2: The method according to Statement 1, wherein the one or more adjustments are associated with at least one of the one or more sensors, the one or more actuators, and the one or more models.

Statement 3: The method according to Statement 1 or Statement 2, further comprising: based on a cause or condition associated with the measured state, modifying an operation of an actuator.

Statement 4: The method according to any one of Statements 1 to 3, wherein modifying the operation comprises activating the actuator or turning off the actuator.

Statement 5: The method according to any one of Statements 1 to 4, further comprising: detecting a condition in at least one of the plurality of wells or wellbores; and identifying the measured state based on the detected condition.

Statement 6: The method according to any one of Statements 1 to 5, further comprising: determining a source of the condition.

Statement 7: The method according to any one of Statements 1 to 6, further comprising: adjusting an operation of at least one of the one or more actuators and the plurality of computing devices based on at least one of the condition and the source of the condition.

Statement 8: The method according to any one of Statements 1 to 7, wherein the one or more actuators comprise at least one of a choke, a downhole valve, an artificial lift device, a sleeve, an inflow-control device, a perforation, and a system for inducing flow.

Statement 9: The method according to any one of Statements 1 to 8, further comprising: based on a cause of a condition associated with the measured state, modifying an operation of at least one of the one or more actuators, the one or more sensors, and the plurality of devices, the operation being with respect to one or more activities comprising at least one of infill drilling, planning sidetracks, injecting proppants or surfactants, perforations, and extracting hydrocarbons from the field.

Statement 10: The method according to any one of Statements 1 to 9, further comprising sequestering and reinjecting at least one of gases and liquids produced at the field to adjust hydrocarbon production by altering a chemistry of a reservoir to increase a flow of hydrocarbons or increase a pressure of the reservoir.

Statement 11: A system comprising: a field comprising a plurality of wells, each of the plurality of wells having a respective topology of computing devices respectively coupled with at least one of one or more sensors, and one or more actuators; one or more processors; and memory having stored therein instructions which, when executed by the one or more processors, cause the one or more processors to: generate a respective graph for the plurality of wells, each respective graph comprising a plurality of computing devices, wherein each of the plurality of computing devices is coupled with at least one of the one or more sensors and one or more actuators, wherein the graph is based on the topology of the field; collect respective parameters associated with the plurality of computing devices and at least one of the one or more sensors, the one or more actuators, and one or more models; identify a measured state associated with at least one of a computing device from the plurality of computing devices, a sensor from the one or more sensors, and an actuator from the one or more actuators, and a model from the one or more models, the measured state being associated with at least one of current hydrocarbons and a current economic parameter associated with the current hydrocarbons; based on the respective graph and respective parameters, generate a decision tree for the measured state; and determine one or more adjustments associated with the measured state for modifying production of at least one of the current hydrocarbons or improving the current economic parameter associated with the current hydrocarbons.

Statement 12: The system according to Statement 11, further comprising the memory storing additional instructions which, when executed by the one or more processors, cause the one or more processors to: based on the decision tree, detect a cause of a decrease in the current hydrocarbon production or the current economic parameter associated with the current hydrocarbon production; and based on a cause of the decrease, modify an operation of at least one of the one or more actuators.

Statement 13: The system according to any one of Statements 11 to 12, wherein modifying the operation comprises at least one of activating an actuator and turning off the actuator.

Statement 14: The system according to any one of Statements 11 to 13, wherein the one or more adjustments comprise modifying at least one of the one or more sensors, the one or more actuators, and the one or more models.

Statement 15: The system according to any one of Statements 11 to 14, further comprising the memory storing additional instructions which, when executed by the one or more processors, cause the one or more processors to: based on the measured state, identify a condition in at least one of the plurality of wells.

Statement 16: The system according to any one of Statements 11 to 15, the memory storing additional instructions which, when executed by the one or more processors, cause the one or more processors to: based on the decision tree, determine a source of the condition.

Statement 17: The system according to any one of Statements 11 to 16, the memory storing additional instructions which, when executed by the one or more processors, cause the one or more processors to: adjust an operation of at least one of the one or more actuators and the plurality of computing devices based on at least one of the condition and the source of the condition.

Statement 18: The system according to any one of Statements 11 to 17, wherein the one or more actuators comprise at least one of a choke, a downhole valve, an artificial lift device, a sleeve, an inflow-control device, a perforation, and a method of inducing flow.

Statement 19: The system according to any one of Statements 11 to 18, the memory storing additional instructions which, when executed by the one or more processors, cause the one or more processors to: based on the measured state, modify an operation of at least one of the one or more actuators, the one or more sensors, the one or more models, and the plurality of devices, the operation being with respect to one or more activities comprising at least one of infill drilling, planning sidetracks, injecting proppants or surfactants, perforations, and extracting hydrocarbons from the field.

Statement 20: A non-transitory computer-readable storage medium comprising: instructions stored thereon which, when executed by one or more processors, cause the one or more processors to: generate a respective graph for the plurality of wells, each respective graph comprising a plurality of computing devices, wherein each of the plurality of computing devices is coupled with at least one of the one or more sensors, and one or more actuators, wherein the graph is based on the topology of the field; collect respective parameters associated with the plurality of computing devices and at least one of the one or more sensors, the one or more actuators, and the one or more models; identify a measured state associated with at least one of a computing device from the plurality of computing devices, a sensor from the one or more sensors, an actuator from the one or more actuators, and a model from the one or more models, the measured state being associated with at least one of current hydrocarbons and a current economic parameter associated with the current hydrocarbons; based on the respective graph and respective parameters; generate a decision tree for the measured state; and determine one or more adjustments associated with the measured state for modifying production of at least one of the current hydrocarbons or the current economic parameter associated with the current hydrocarbons.

Statement 21: A system comprising means for performing a method according to any one of Statements 1 to 10.

Statement 22: A computer-readable storage medium comprising computer-executable code for performing a method according to any one of Statements 1 to 10.

What is claimed is:

1. A method comprising:
based on a topology of a field comprising a plurality of wells, generating a respective graph for the plurality of wells, each respective graph comprising a plurality of computing devices, wherein each of the plurality of computing devices is coupled with at least one of one or more sensors, one or more actuators;
said graph illustrates the layout of said sensors or said actuators as well as the topology of said field;
collecting, via the plurality of computing devices, respective parameters associated with one or more of the plurality of computing devices and at least one of the one or more sensors, the one or more actuators, and a plurality of models, wherein the plurality of models includes a first model configured to receive and analyze data from a first computing device of the plurality of computing devices and a second model configured to receive and analyze data from each of the plurality of computing devices;
identifying a measured state associated with the first computing device from the plurality of computing devices, a sensor from the one or more sensors, an actuator from the one or more actuators, and at least the first model and the second model from the plurality of models, the first model including an operating envelope for the first computing device and the second model including an operating envelope for the plurality of computing devices, the measured state corresponding to at least one of a current hydrocarbon production and a current economic parameter associated with the current hydrocarbon production;
based on the respective graph and respective parameters, generating a decision tree for the measured state; and
based on the decision tree, determining one or more adjustments associated with the measured state for modifying production of at least one of the current hydrocarbon production or improving the current economic parameter associated with the current hydrocarbon production to maintain an oilfield equilibrium;
based on the decision tree, identifying a root cause analysis or condition associated with the measured state from at least the first model and the second model from the plurality of models of the plurality of computing devices; and
after identifying the root cause analysis or condition from at least the first model and the second model from the plurality of models of the plurality of computing devices, modifying an operation of a first actuator to maintain the oilfield equilibrium.

2. The method of claim 1, wherein the one or more adjustments are associated with at least one of the one or more sensors, the one or more actuators, and the plurality of models.

3. The method of claim 1, wherein modifying the operation comprises activating the actuator or turning off the actuator.

4. The method of claim 1, further comprising:
  detecting a condition in at least one of the plurality of wells or wellbores; and
  identifying the measured state based on the detected condition.

5. The method of claim 4, further comprising:
  determining a source of the condition.

6. The method of claim 5, further comprising:
  adjusting an operation of at least one of the one or more actuators and the plurality of computing devices based on at least one of the condition and the source of the condition.

7. The method of claim 1, wherein the one or more actuators comprise at least one of a choke, a downhole valve, an artificial lift device, a sleeve, an inflow-control device, a perforation, and a system for inducing flow.

8. The method of claim 7, further comprising:
  based on a cause of a condition associated with the measured state, modifying an operation of at least one of the one or more actuators, the one or more sensors, and the plurality of devices, the operation being with respect to one or more activities comprising at least one of infill drilling, planning sidetracks, injecting proppants or surfactants, perforations, and extracting hydrocarbons from the field.

9. The method of claim 1, further comprising sequestering and reinjecting at least one of gases and liquids produced at the field to adjust hydrocarbon production by altering a chemistry of a reservoir to increase a flow of hydrocarbons or increase a pressure of the reservoir.

10. A system comprising:
  a field comprising a plurality of wells, each of the plurality of wells having a respective topology of computing devices respectively coupled with at least one of one or more sensors, and one or more actuators;
  one or more processors; and
  memory having stored therein instructions which, when executed by the one or more processors, cause the one or more processors to:
  generate a respective graph for the plurality of wells, each respective graph comprising a plurality of computing devices, wherein each of the plurality of computing devices is coupled with at least one of the one or more sensors and one or more actuators, wherein the graph illustrates the layout of said sensors or said actuators as well as the topology of the field;
  collect respective parameters associated with the plurality of computing devices and at least one of the one or more sensors, the one or more actuators, and plurality of models, wherein the plurality of models includes a first model configured to receive and analyze data from a first computing device of the plurality of computing devices and a second model configured to receive and analyze data from each of the plurality of computing devices;
  identify a measured state associated with the first computing device from the plurality of computing devices, a sensor from the one or more sensors, and an actuator from the one or more actuators, and at least the first model and the second model from the plurality of models, the first model including an operating envelope for the first computing device and the second model including an operating envelope for the plurality of computing devices, the measured state being associated with at least one of a current hydrocarbon production and a current economic parameter associated with the current hydrocarbon production;
  based on the respective graph and respective parameters, generate a decision tree for the measured state;
  determine one or more adjustments associated with the measured state for modifying production of at least one of the current hydrocarbon production or improving the current economic parameter associated with the current hydrocarbon production to maintain an oilfield equilibrium;
  based on the results from the decision tree, detect a root cause analysis of a decrease in the current hydrocarbon production or the current economic parameter associated with the current hydrocarbon production from at least the first model and the second model from the plurality of models of the plurality of computing devices; and;
  based on the root cause analysis of the decrease, modify an operation of at least one of the one or more actuators to maintain the oilfield equilibrium.

11. The system of claim 10, wherein modifying the operation comprises at least one of activating an actuator and turning off the actuator.

12. The system of claim 10, wherein the one or more adjustments comprise modifying at least one of the one or more sensors, the one or more actuators, and the plurality of models.

13. The system of claim 10, further comprising the memory storing additional instructions which, when executed by the one or more processors, cause the one or more processors to:
  based on the measured state, identify a condition in at least one of the plurality of wells.

14. The system of claim 13, the memory storing additional instructions which, when executed by the one or more processors, cause the one or more processors to:
  based on the decision tree, determine a source of the condition.

15. The system of claim 14, the memory storing additional instructions which, when executed by the one or more processors, cause the one or more processors to:
  adjust an operation of at least one of the one or more actuators and the plurality of computing devices based on at least one of the condition and the source of the condition.

16. The system of claim 10, wherein the one or more actuators comprise at least one of a choke, a downhole valve, an artificial lift device, a sleeve, an inflow-control device, a perforation, and a method of inducing flow.

17. The system of claim 16, the memory storing additional instructions which, when executed by the one or more processors, cause the one or more processors to:
  based on the measured state, modify an operation of at least one of the one or more actuators, the one or more sensors, the plurality of models, and the plurality of devices, the operation being with respect to one or more activities comprising at least one of infill drilling, planning sidetracks, injecting proppants or surfactants, perforations, and extracting hydrocarbons from the field.

18. A non-transitory computer-readable storage medium comprising:
  instructions stored thereon which, when executed by one or more processors, cause the one or more processors to:
  generate a respective graph for a field comprising a plurality of wells, each respective graph comprising a plurality of computing devices, wherein each of the plurality of computing devices is coupled with at least one of the one or more sensors, and one or more actuators, wherein the graph illustrates the layout of said sensors or said actuators as well as the topology of the field;

collect respective parameters associated with the plurality of computing devices and at least one of the one or more sensors, the one or more actuators, and a plurality of models, wherein the plurality of models includes a first model configured to receive and analyze data from a first computing device of the plurality of computing devices and a second model configured to receive and analyze data from each of the plurality of computing devices;

identify a measured state associated with the first computing device from the plurality of computing devices, a sensor from the one or more sensors, an actuator from the one or more actuators, and at least the first model and the second model from the plurality of models, the first model including an operating envelope for the first computing device and the second model including an operating envelope for the plurality of computing devices, the measured state being associated with at least one of current hydrocarbon production and a current economic parameter associated with the current hydrocarbon production;

based on the respective graph and respective parameters, generate a decision tree for the measured state; and determine one or more adjustments associated with the measured state for modifying production of at least one of the current hydrocarbon production or the current economic parameter associated with the current hydrocarbon production to maintain an oilfield equilibrium; and based on the decision tree, identify a root cause analysis or condition associated with the measured state from at least the first model and the second model from the plurality of models of the plurality of computing devices; and after identifying the root cause analysis or condition from at least the first model and the second model from the plurality of models of the plurality of computing devices, modifying an operation of a first actuator to maintain an oilfield equilibrium.

* * * * *